(12) United States Patent
Strabley et al.

(10) Patent No.: US 7,802,928 B2
(45) Date of Patent: Sep. 28, 2010

(54) SYSTEM AND METHOD FOR FIBER BASED RESONATOR COUPLING

(75) Inventors: Jennifer S. Strabley, Maple Grove, MN (US); Glen A. Sanders, Scottsdale, AZ (US); James F. Detry, Plymouth, MN (US); Paul Eugene Bauhahn, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 11 days.

(21) Appl. No.: 11/969,822

(22) Filed: Jan. 4, 2008

(65) Prior Publication Data

US 2009/0175578 A1    Jul. 9, 2009

(51) Int. Cl.
G02B 6/26 (2006.01)
G02B 6/36 (2006.01)

(52) U.S. Cl. .............................. 385/92; 385/27; 385/88

(58) Field of Classification Search ....................... None
See application file for complete search history.

(56) References Cited

U.S. PATENT DOCUMENTS

| | | | | |
|---|---|---|---|---|
| 4,135,822 A | * | 1/1979 | Ezekiel | 356/461 |
| 4,549,782 A | * | 10/1985 | Miller | 385/48 |
| 4,750,799 A | * | 6/1988 | Kawachi et al. | 385/14 |
| 4,810,557 A | * | 3/1989 | Blonder | 428/156 |
| 4,909,585 A | * | 3/1990 | Kobayashi et al. | 398/141 |
| 5,119,448 A | * | 6/1992 | Schaefer et al. | 385/4 |
| 5,243,671 A | * | 9/1993 | Koteles et al. | 385/31 |
| 5,393,371 A | | 2/1995 | Chang et al. | |
| 5,537,671 A | * | 7/1996 | Toyama et al. | 385/27 |
| 5,857,049 A | | 1/1999 | Beranek et al. | |
| 5,872,877 A | * | 2/1999 | Haavisto | 385/15 |
| 6,250,819 B1 | | 6/2001 | Porte et al. | |
| 6,393,183 B1 | | 5/2002 | Worley | |
| 6,580,858 B2 | | 6/2003 | Chen et al. | |
| 6,748,132 B1 | | 6/2004 | Kapany et al. | |
| 6,751,395 B1 | | 6/2004 | Novotny et al. | |
| 6,864,509 B2 | | 3/2005 | Worley | |
| 6,874,950 B2 | | 4/2005 | Colgan et al. | |
| 6,985,645 B2 | | 1/2006 | Cohen et al. | |
| 7,116,886 B2 | | 10/2006 | Colgan et al. | |
| 7,157,016 B2 | | 1/2007 | Steinberg | |
| 7,233,713 B2 | | 6/2007 | Blauvelt et al. | |
| 7,269,317 B2 | | 9/2007 | Blauvelt et al. | |
| 7,419,311 B2 | * | 9/2008 | Terashima et al. | 385/88 |
| 2004/0047536 A1 | * | 3/2004 | Pickrell et al. | 385/12 |
| 2007/0133003 A1 | | 6/2007 | Sanders et al. | |
| 2007/0248301 A1 | * | 10/2007 | Terashima et al. | 385/35 |

FOREIGN PATENT DOCUMENTS

EP             92831 A2 *  11/1983

\* cited by examiner

*Primary Examiner*—Uyen-Chau N Le
*Assistant Examiner*—Chris H Chu
(74) *Attorney, Agent, or Firm*—Fogg & Powers LLC

(57) ABSTRACT

A fiber optic alignment device on a crystalline substrate support is disclosed. An exemplary embodiment embodied in a resonator fiber optic gyro is fabricated by a process of forming a crystalline substrate support structure operable to support the first end portion of the optical fiber and the second end portion of the optical fiber; forming a first end V-groove portion and a second end V-groove portion in the support structure; physically coupling the first end portion of the optical fiber to the first end V-groove portion; and physically coupling the second end portion of the optical fiber to the second end V-groove portion.

17 Claims, 5 Drawing Sheets

SYSTEM AND METHOD FOR FIBER BASED RESONATOR COUPLING

BACKGROUND OF THE INVENTION

Gyros measure rotation rates or changes in angular velocity about an axis. A basic conventional fiber optic gyro (FOG) includes a light source, a beam generating device, and a coil of optical fiber coupled to the beam generating device that encircles an area. The beam generating device transmits light beams into the coil that propagate in a clockwise (CW) direction and a counter-clockwise (CCW) direction along the core of the optical fiber. The two counter-propagating (CW and CCW) beams experience different path lengths while propagating around a rotating path, and the difference in the two path lengths is proportional to the rotational rate. FOGs have accuracies that generally increase with the area encircled by the optical path of the light beams. Thus, the larger the area enclosed by the optical path, the greater the signal-to-noise ratio of the FOG. Also, to improve the signal-to-noise ratio of the FOG, the optical path may be increased by increasing the number of turns of the coil.

In a resonator fiber optic gyro (RFOG), the counter-propagating light beams are monochromatic and recirculate through multiple turns of the coil and for multiple passes through the coil using a recirculator such as a fiber coupler or other reflective device. The beam generating device typically modulates and/or shifts the frequencies of each of the counter-propagating light beams so that the resonance frequencies of the resonant coil may be observed. The resonance frequencies for each of the CW and CCW paths through the coil are based on a constructive interference of successively recirculated beams in each optical path. A rotation of the coil produces a shift in the respective resonance frequencies of the resonant coil and the frequency difference associated with tuning the CW beam and CCW beam frequencies to match the coil's resonance frequency shift due to rotation indicates the rotation rate. A reflective mirror may be used to recirculate the counter-propagating light beams in the coil but this typically reduces the signal-to-noise ratio from losses generated at the transition from the mirror to the coil.

Accordingly, it is desirable to provide a fiber optic gyro capable of measuring rotational rates with an accuracy sufficient for navigation systems. In addition, it is desirable to provide a high accuracy fiber optic gyro for integration with relatively small platforms and made relatively inexpensively. Good performance of the RFOG is premised on having a low fiber-to-fiber coupling loss so that the light makes many trips through the fiber coil. The prior art in this field uses a highly reflective mirror (e.g.: 98% reflectivity) to do the fiber-to-fiber coupling. While this architecture uses the advantage that reflective mirror coatings can be made very precisely with multiple dielectric coatings, it suffers a serious disadvantage, namely that it is difficult to insure the two fiber ends are aligned to each other. An implementation of this design would require time consuming and expensive active and by-hand alignments.

FIG. 1 is a block diagram of an exemplary resonator fiber optic gyro 102. The operation of an exemplary resonator fiber optic gyro 102 is described hereinbelow, and in greater detail in the commonly assigned U.S. application having Ser. No. 11/298,439, filed on Dec. 9, 2005, and now published as U.S. 2007/0133003, which is incorporated by reference herein in its entirety. The resonator fiber optic gyro 102 comprises two lasers 104, 106 (e.g., light sources such as tunable lasers, laser diodes, or other suitable light sources) that synthesize light beams, respectively, a resonator 108 circulating light beams in counter-propagating directions and having a recirculator 110 that introduces a portion of the light beams from the lasers 104, 106 into the resonator 108, photodetectors 112, 114 that sample light circulating in the resonator 108, resonance detectors 116, 118 coupled to the photodetectors 114, 112, respectively, that detect the centers of resonance dips for each of the counter-propagating directions of the resonator 108, and servos 120, 122 having an input coupled to the resonance detectors 116, 118, respectively, and an output coupled to the lasers 104, 106, respectively. These components of the resonator fiber optic gyro 102 thus form resonance tracking loops 124, 126 for each counter-propagating direction [e.g., clockwise (CW) and counter clockwise (CCW)].

The resonator 108 comprises the recirculator 110 and optical fiber coil 136 with a plurality of loops. In an exemplary embodiment, optical fiber coil 136 is a hollow core optical fiber, although any suitable optical fiber may be used. Fiber optic coil 136 has a first end 138 and a second end 140. Each end 138, 140 is physically coupled a respective support portion of the recirculator 110. The recirculator 110 introduces CW and CCW input light beams into the optical fiber coil 136 and circulates a portion of the modulated light beams through the optical fiber coil 136. The recirculator 110 reintroduces light emerging from one end of the optical fiber coil 136 into the other end of the fiber coil 136, thus causing light to propagate through the fiber coil 136 many times. By application of the Sagnac Effect, the fiber optic gyro 102 senses a rotation rate about an axis of the fiber optic gyro 102. Efficient light recirculation requires precise alignment of the optical fiber coil ends 138, 140.

SUMMARY OF THE INVENTION

A system and method for a fiber optic alignment device on a crystalline substrate support are disclosed. An exemplary embodiment of a fiber optic alignment device embodied in a resonator fiber optic gyro is fabricated by a process of forming a crystalline substrate support structure operable to support the first end portion of the optical fiber and the second end portion of the optical fiber; forming a first end V-groove portion and a second end V-groove portion in the support structure; physically coupling the first end portion of the optical fiber to the first end V-groove portion; and physically coupling the second end portion of the optical fiber to the second end V-groove portion.

In accordance with further aspects, an exemplary embodiment is fabricated by a process of forming a crystalline substrate support structure operable to support the first end portion of the optical fiber and the second end portion of the optical fiber; forming a V-groove in the support structure along an axis, the V-groove defined by a central V-groove portion, a first end V-groove portion, and a second end V-groove portion, each of the V-groove portions aligned end-to-end along the axis; physically coupling the first end portion of the optical fiber to the first end V-groove portion so that the first end of the optical fiber is directed towards the central V-groove portion and is aligned along the axis; and physically coupling the second end portion of the optical fiber to the second end V-groove portion so that the second end of the optical fiber is directed towards the central V-groove portion, is aligned along the axis, and is facing the first end of the optical fiber.

In accordance with other aspects, a fiber optic system has an optical fiber defined by a central portion, a first end portion with a first end, and a second end portion with a second end, the first end and the second end operable to transmit and receive light; a first light source operable to generate a first light beam that is receivable by the second end of the optical fiber, the first light beam traveling towards the central portion of the optical fiber; a crystalline substrate support structure with at least one V-groove thereon, the V-groove aligned along an axis, and defined by a central V-groove portion and a first end V-groove portion; a binder operable to physically couple the first end V-groove portion to the first end portion of the optical fiber so that the first end of the optical fiber is directed towards the central V-groove portion and is aligned along the axis; and a light transmissive optical component aligned along the axis and operable to receive the light beam exiting the first end of the optical fiber via an intervening free space.

BRIEF DESCRIPTION OF THE DRAWINGS

Preferred and alternative embodiments are described in detail below with reference to the following drawings.

DETAILED DESCRIPTION OF THE PREFERRED EMBODIMENT

Embodiments of a V-groove support may be implemented in a variety of fiber optic devices, such as, but not limited to, fiber optic resonator systems that detect absorbed gases, fiber optic systems that detect deformations in an object, and other types of fiber optic systems employing an optical fiber. In an exemplary embodiment, a V-groove is etched into a silicon based optical bench wherein the mask used to etch the V-groove. The mask uses a precise width along the mask pattern of the V-groove. The etching process forms the V-groove such that when the ends of the optical fiber are attached into the V-groove, the optical fiber ends are precisely aligned with each other. Accordingly, light may be recirculated between the precisely aligned ends of the optical fiber. Embodiments of the V-groove support may be used in various types of fiber optic gyros and other fiber optic devices that require precise alignment of the ends of an optical fiber.

Figure 2:
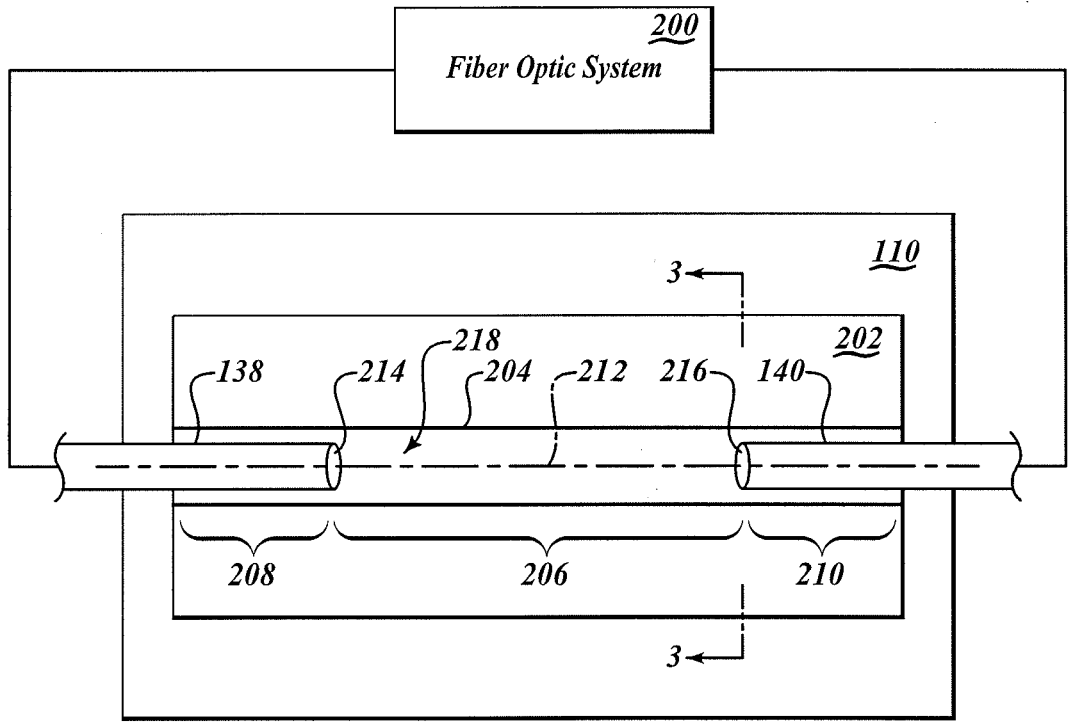
FIG. 2 is a view of the orientation of the ends of an optical fiber in accordance with an exemplary embodiment.

FIG. 2 is a view of the orientation of the ends of the fiber optic system 200 in accordance with an exemplary embodiment of a silicon optical bench with a V-groove support. The V-groove support resides in the resonator 108. The silicon optical bench comprises a support structure 202 with a V-groove 204 disposed thereon. The silicon optical bench 202 may be a silicon crystalline substrate structure, such as, but not limited to, a monocrystalline silicon substrate. In other embodiments, a support structure similar to a silicon optical bench may be used with a V-groove 204 thereon.

The exemplary V-groove 204 includes a central V-groove portion 206 and two end V-groove portions 208, 210. In this exemplary embodiment, the orientation of the V-groove 204 forms an axis 212 that is parallel to the direction of the V-groove 204. Accordingly, each of the V-groove portions 206, 208, 210 are aligned along the axis 212.

One end portion 138 of the fiber optic system 200 is physically coupled to the end V-groove portion 208. The opposing end portion 140 of the fiber optic system 200 is physically coupled to the other end V-groove portion 210. Various optic elements may be fabricated on and/or attached to the central V-groove portion 206 of the V-groove 204.

When the optical fiber end portion 138 is physically coupled (i.e. glued, epoxied, or soldered) to the V-groove end portion 208, the end 214 of the fiber optic system 200 is aligned with the axis 212 and is facing the central V-groove portion 206. When the optical fiber end portion 140 is physically coupled to the V-groove end portion 210, the end 216 of the fiber optic system 200 is aligned with the axis 212 and is facing the central V-groove portion 206. Accordingly, the ends 214 and 216 are facing each other, and are in precise alignment because the ends 214 and 216 reside in the V-groove 204.

The V-groove portion 206 has an intervening free space 218 between the ends 214 and 216. Free space 218 may be filled with a gas or free space 218 may be a vacuum. Thus, light entering and/or exiting the ends 214 and 216 passes through the intervening free space 218. As noted above, various optical components may also reside in the intervening free space 218 of the centrally located V-groove portion 206.

Figure 1:
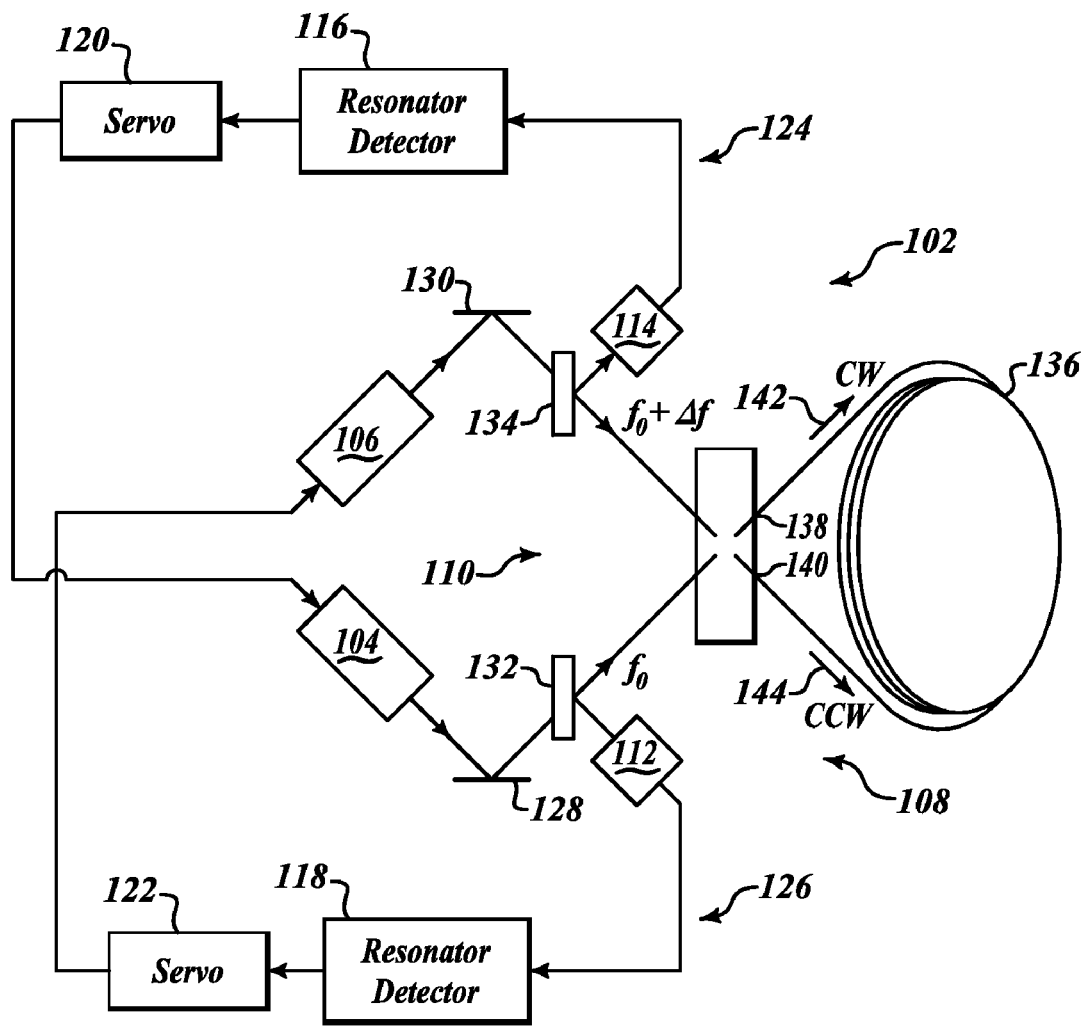
FIG. 1 is a block diagram of an exemplary embodiment of a fiber optic gyro.
Figure 3:
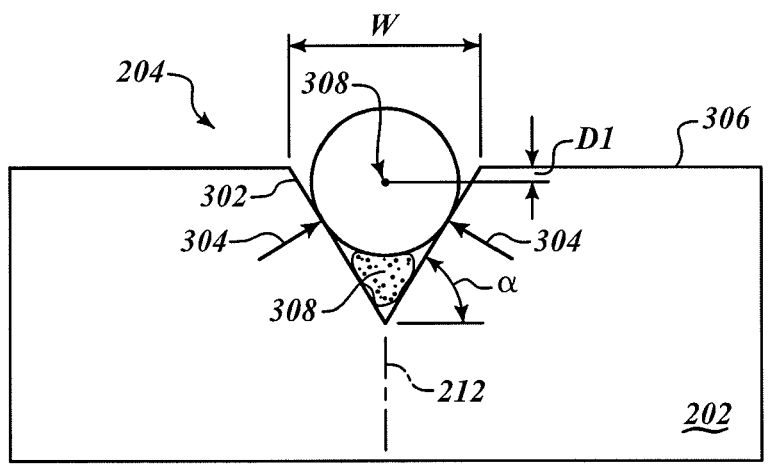
FIG. 3 is a side view of a V-groove fabricated in a silicon crystal based support.

FIG. 3 is a side view along the plane 3-3' (FIG. 1) of a V-groove 204 fabricated in an exemplary silicon crystal support structure 202. The V-groove 204 is formed by anisotropic etching of the silicon crystal support structure 202 along selected planes of the silicon crystal structure, such as crystal planes defined by, but not limited to, the (111) Miller indices. The V-groove 204 may be characterized by an angle α and a width W. When the V-groove 204 is etched into a silicon bench, the angle α corresponds to the (111) plane. Preferably, the width W is constant along the length of the V-groove 204, and more particularly, along the lengths of the end portions 138, 140. This consistency in the width W is facilitated by a closely controlled mask line and etching process.

When the end portions 138, 140 of the fiber optic system 200 are positioned into the respective end V-groove portions 208, 210, the end portions 138, 140 of the fiber optic system 200 are in contact with side walls 320 of the V-groove 204 at locations 304. As noted above, the locations 304 are a function of the angle α and the width of the V-groove.

The end V-groove portions 208, 210 are definable by a length. The length may be predefined or variable, and/or the length may be different for the end V-groove portions 208, 210.

Further, the angle α of the V-groove 204 is substantially constant along the length of the end V-groove portions 208, 210, thereby improving alignment of the end portions 138, 140 with respect to each other and/or the optics of the fiber optic gyro 102. Since the end portions 138, 140 of the fiber optic system 200 have substantially the same diameter, and since the angle α and/or the width W are substantially constant for both of the end V-groove portions 208, 210, the distance D1 corresponding to the distance between the surface 306 of the support structure 202 and the center 308 of the end portions 138, 140 of the fiber optic system 200 is substantially the same for both end portions 138, 140. Here, the angle α and the width W of the V-groove 204 is such that the center 308 is below the surface 306. However, the angle α and/or the width W of the V-groove 204 may be such that the center 308 is level with, or higher than, the surface 306. The distance D1 is controllable by defining the width W of the V-groove 204.

Since each end portion 138, 140 of the fiber optic system 200 is located at substantially the same position in its respective end V-groove portion 208, 210, the centers 308 of the two end portions 138, 140 are aligned with each other. That is, the end 214 of the end portion 138 is facing, and is in alignment with, the end 216 of the end portion 140. Ideally, with identical dimensions of the end portion 138, 140, and identical dimensions of the V-groove portions 208, 210, the ends 216 and 138 will be exactly in alignment with each other. With relatively small variations in the dimensions of the end portion 138, 140, and/or dimensions of the V-groove portions 208, 210, the ends 216 and 138 will be substantially in alignment with each other.

With a V-groove embodiment implemented in a resonator fiber optic gyro, CW light exits the end 216 and travels in a path that is parallel to the axis 212. Since the center 308 of the end portions 138, 140 of the fiber optic system 200 are aligned with each other, a substantial portion of the exiting CW light is received at the end 214, depending upon the amount of beam spread occurring as the light propagates through free space. The received CW light continues traveling through the fiber optic system 200 in the CW direction.

CCW light exits the end 214 and travels in a path that is parallel to the axis 212. Since the center 308 of the end portions 138, 140 of the fiber optic system 200 are aligned with each other, a substantial portion of the CCW light is received at the end 216. The received CCW light continues traveling through the fiber optic system 200 in the CCW direction.

Loss of light due to misalignments between the end portions 138, 140 of the fiber optic system 200 is significantly and unexpectedly reduced since the ends 214, 216 are substantially aligned with each other. That is, a V-groove 204 formed in a precise manner allows precise physical coupling of the end portions 138, 140 of the fiber optic system 200 into the support structure 202 such that the end portions 138, 140 are precisely aligned with each other.

A binder 310 is used to physically couple the end portions 138, 140 of the fiber optic system 200 into their respective end V-groove portions 208, 210. The binder 310 may be a light curable binder, such as, but not limited to an ultra violet (UV) curable binder. The binder 310 may alternatively be a heat curable binder. Other embodiments may employ any suitable binder 310 to physically couple the end portions 138, 140 to their respective end V-groove portions 208, 210. Non-limiting example of such binders 310 include blocks, straps, bars and other types of fasteners.

Figure 4:
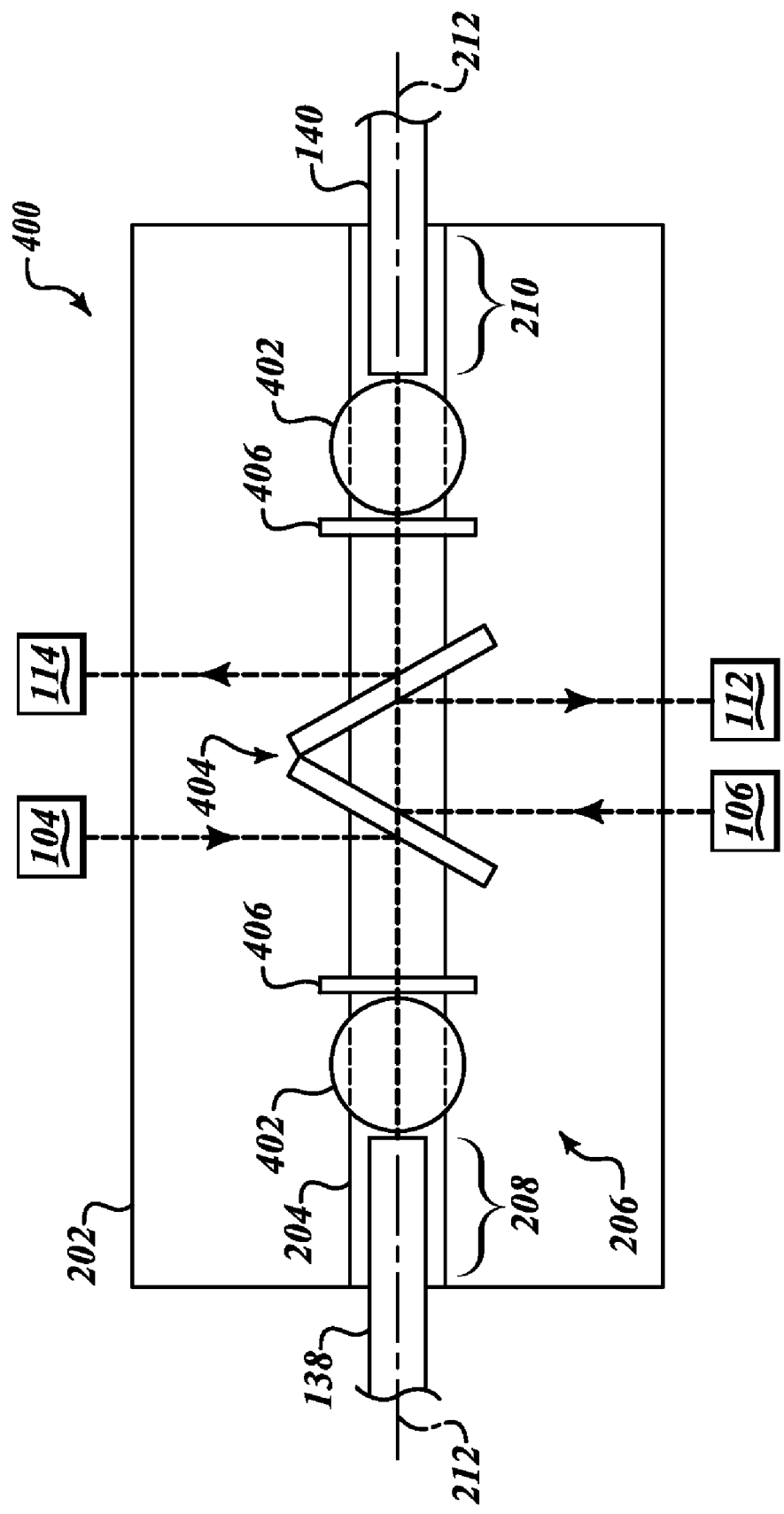
FIG. 4 is a block diagram of an exemplary embodiment indicating orientation of the ends of the optical fiber with a first arrangement of a plurality of optical elements.
Figure 5:
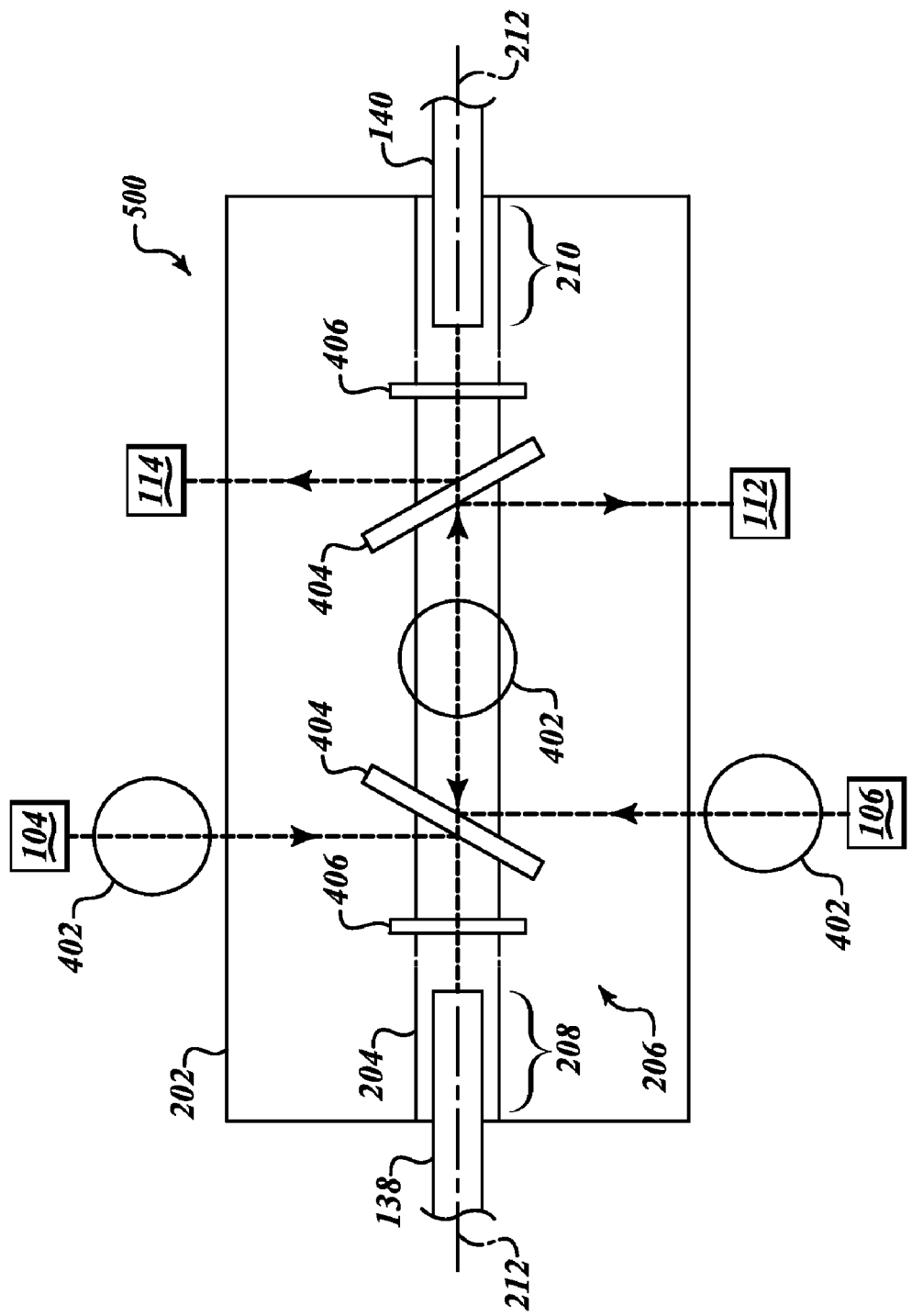
FIG. 5 is a block diagram of an exemplary embodiment indicating orientation of the ends of the optical fiber with a second arrangement of a plurality of optical elements.

FIG. 4 is a block diagram of an exemplary V-groove embodiment indicating orientation of the ends 214, 216 of the fiber optic system 200 with a first arrangement 400 of a plurality of optical elements. FIG. 5 is a block diagram of an exemplary V-groove embodiment indicating orientation of the ends 214, 216 of the fiber optic system 200 with a second arrangement 500 of a plurality of optical elements. Non-limiting examples of optical elements include ball lens 402, transmissive mirrors 404, and polarizing filters 406. It is appreciated that any number of selected optical elements 402, 404, 406 may be located in the central V-groove portion 206, and that such selected optical elements 402, 404, 406 may be configured in any desirable manner.

Figure 6:
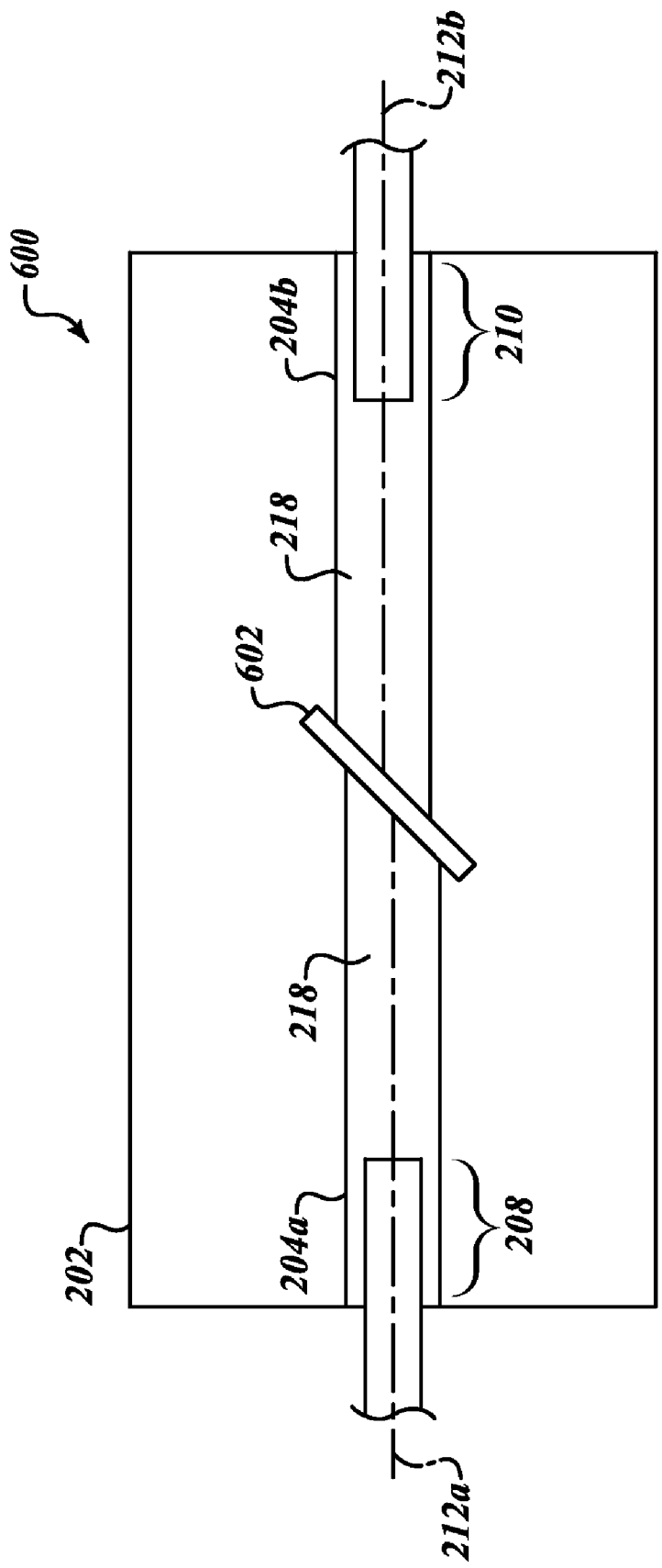
FIG. 6 is a view of the orientation of the ends of an optical fiber in accordance with an offset V-groove embodiment.

FIG. 6 is a view of the orientation of the ends of an optical fiber in accordance with an offset V-groove embodiment 600. The offset of the V-grooves 204a, 204b compensates for the offset in light caused by one or more optical elements 602. That is, the offset of the V-groove axis 212a and the V-groove axis 212b corresponds to the amount of light offset from the optical element 602.

The V-groove 204 may be used to facilitate placement and/or alignment of other optical elements in the fiber optic gyro 102. As noted above, the end portions 138, 140 of the fiber optic system 200 are substantially aligned with each other along the axis 212. Thus, the path of travel of the light through the free space of the central V-groove portion 206 is determinable with respect to the location of the V-groove 202, and more particularly, is determinable with respect to the axis 212. Accordingly, other optical elements, such as the ball lens 402, the transmissive mirrors 404, the polarizing filters 406, or the like may be located in and/or generally aligned with the central V-groove portion 206 in desired positions with respect to the end portions 138, 140. That is, the other optical elements may be positioned with respect to the known location of the V-groove 204, and more particularly, with respect to the axis 212.

In the various embodiments, a V-shaped groove 204 is preferred in that a V-shaped groove provides a self-correcting means that orients and positions the end portions 138, 140 with respect to each other. For example, a first support structure may have end V-groove portions 208, 210 in a V-shaped configuration at a particular width. A second support structure may also have the end V-groove portions 208, 210 in a V-shaped configuration, but having a another width that is different from the V-groove of the first support structure. With either of the support structures, the end portions 138, 140 of their respective fiber optic system 200 will be positioned and oriented such that their respective ends 214, 216 are in alignment with each other. Thus, the use of a V-groove 204 provides a high degree of tolerance in the design and manufacturing processes.

Any suitable fabrication means and/or techniques may be used to form a V-groove 204. For example, anisotropic etching techniques may be used to form a V-groove.

In some embodiments, two separate V-grooves may be formed. Preferably, the V-grooves are formed using the same mask and are concurrently etched. A portion of the first V-groove may be used to position and orient the end portion 138, and a portion of the second V-groove may be used to position and orient the other end portion 140. Because the V-grooves 204 position and orient their respective the end portions 138, 140 of the fiber optic system 200 in a known manner, the optical devices can be arranged in any desirable configuration to process the light emitted and/or received by the ends 214, 216 of the fiber optic system 200.

For example, and in reality, when light propagates through the silicon partial reflecting mirrors (which are essentially windows with nonzero reflectance), the transmitted light will be transversely displaced relative to the input light. Depending on the index of refraction and the thickness of the window, this displacement is non-negligible. The vertical height of the transmitted light is the same as the vertical height of the input light. In order to maximally couple light from fiber-to-fiber, the V-grooves, and any intermediate optics, need to be offset to account for this displacement. The displacement is easily calculated and can be accounting for in the fabrication mask. The vertical height is unaffected and is still auto-aligned.

In some embodiments, the end portions 138, 140 of the optical fiber and/or the V-grooves may have a guide means thereon to assist in alignment of the light polarization to a preferred fiber axis. For example, the end portions 138, 140 may have one or more flattened portions, notches, stripes and/or other guides thereon.

Some embodiments of the support structure 202 may have the V-groove 204, or its equivalent, formed internally. For example, in embodiments that have a silicon type support structure 202, deep etching processes may be used to form an internal V-groove shaped structure.

In some embodiments, the end portions 138, 140 need to be aligned along a particular light polarization axis. When the first end portion 138 of the optical fiber is placed into the first end V-groove portion 208, the first end portion is rotated while the beam of light is emitted from the first end 214. When a maximum light transmission of the beam of light emitted from the first end 214 is detected, the first end portion 138 is secured in the V-groove portion 208. When the second end portion 140 of the optical fiber is placed into the first end V-groove portion 210, the second end portion 140 is rotated while the CW beam of light is emitted from the first end 216. When a maximum light transmission of the beam of light emitted from the second end 216 is detected, the second end portion 140 is secured in the V-groove portion 210

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method for constructing a fiber optic system having an optical fiber defined by a central portion, a first end portion with a first end, and a second end portion with a second end, the method comprising:
   forming a crystalline substrate support structure operable to support the first end portion of the optical fiber and the second end portion of the optical fiber;
   forming a first V-groove in the support structure along an axis, the first V-groove extending over the surface of the crystalline substrate support structure and extending from a first edge of the crystalline substrate support structure toward an opposing second edge of the crystalline substrate support structure;
   forming a second V-groove in the support structure along the axis, the V-groove extending over the surface of the crystalline substrate support structure and extending from the second edge toward the first edge;
   forming a central groove in the support structure along the axis, the central groove extending between the first V-groove and the second V-groove;
   physically coupling the first end portion of the optical fiber to the first V-groove so that the first end of the optical fiber is directed towards the central groove and is aligned along the axis;
   physically coupling the second end portion of the optical fiber to the second V-groove so that the second end of the optical fiber is directed towards the central groove, is aligned along the axis, and is facing the first end of the optical fiber, wherein the optical fiber is continuous between the first end portion, the central portion, and the second end portion;
   positioning a first transmissive mirror along the axis between the first end portion of the optical fiber and the second end portion of the optical fiber; and
   positioning a second transmissive mirror along the axis between the first transmissive mirror and the second end portion of the optical fiber.

2. The method of claim 1, wherein forming the V-grooves comprises:
   anisotropically etching the crystalline substrate support structure along a plane to form the V-grooves.

3. The method of claim 1, further comprising:
   placing an optical element into the central groove in alignment with the axis.

4. The method of claim 1, wherein the first transmissive mirror is positioned at a first angle relative to the axis; and
   wherein the second transmissive mirror is positioned at a second angle relative to the axis.

5. The method of claim 1, further comprising:
   positioning at least one additional light transmissive optical component along the axis between the first end portion of the optical fiber and the second end portion of the optical fiber.

6. A method for constructing a fiber optic gyro with an optical fiber defined by a central portion, a first end portion with a first end, and a second end portion with a second end, the method comprising:
   forming a crystalline substrate support structure operable to support the first end portion of the optical fiber and the second end portion of the optical fiber;
   forming a first V-groove in the support structure that extends to a first edge of the support structure and a second V-groove in the support structure that extends to a second edge of the support structure, wherein the first edge of the support structure opposes the second edge of the support structure;
   forming a central groove between the first V-groove and the second V-groove, wherein the first V-groove, the central groove, and the second V-groove are aligned end-to-end along an axis;
   physically coupling the first end portion of the optical fiber to the first V-groove;
   physically coupling the second end portion of the optical fiber to the second V-groove,
   wherein the first end of the optical fiber is directed towards the central groove, is aligned along the axis, and wherein the second end of the optical fiber is directed towards the central groove, is aligned along the axis, and is facing the first end of the optical fiber, wherein the optical fiber is continuous between the first end portion, the central portion, and the second end portion;
   positioning a first transmissive mirror along the axis between the first end portion of the optical fiber and the second end portion of the optical fiber, the first transmissive mirror positioned at a first angle relative to the axis; and
   positioning a second transmissive mirror along the axis between the first transmissive mirror and the second end portion of the optical fiber, the second transmissive mirror positioned at a second angle relative to the axis.

7. The method of claim 6, wherein forming the first V-groove and the second V-groove comprises:
   anisotropically etching the crystalline substrate support structure along a (111) plane to form a V-groove.

8. The method of claim 6, wherein forming the first V-groove and the second V-groove comprises:
   anisotropically etching the crystalline substrate support structure using a first mask having a width corresponding to a width of the first V-groove; and
   anisotropically etching the crystalline substrate support structure using a second mask having the width corresponding to a width of the second V-groove.

9. The method of claim 6, wherein forming the first V-groove and the second V-groove comprises:
anisotropically etching the crystalline substrate support structure using a mask having a width corresponding to a width of the first V-groove and the second V-groove.

10. The method of claim 6, wherein physically coupling the first end portion of the optical fiber to the first V-groove further comprises:
placing the first end portion of the optical fiber into the first V-groove; rotating the first end portion of the optical fiber;
monitoring the beam of light emitted from the second end of the optical fiber for a maximum light transmission of the beam of light; and
in response to detecting the maximum light transmission, physically coupling the first end portion of the optical fiber to the first V-groove.

11. The method of claim 6, further comprising:
positioning at least one additional light transmissive optical component along the axis between the first end portion of the optical fiber and the second end portion of the optical fiber.

12. A fiber optic system, comprising:
an optical fiber defined by a central portion, a first end portion with a first end, and a second end portion with a second end, the first end and the second end operable to transmit and receive light, wherein the optical fiber is continuous between the first end portion, the central portion, and the second end portion;
a first light source operable to generate a first light beam that is receivable by the second end of the optical fiber, the first light beam traveling towards the central portion of the optical fiber;
a second light source operable to generate a second light beam that is receivable by the first end of the optical fiber, the second light beam traveling towards the central portion of the optical fiber in an opposing direction with respect to the first light beam;
a crystalline substrate support structure having:
a first V-groove thereon extending over the surface of the crystalline substrate support structure and extending from a first edge of the crystalline substrate support structure toward an opposing second edge of the crystalline substrate support structure, the first V-groove aligned along a first axis,
a second V-groove thereon extending over the surface of the crystalline substrate support structure and extending from the second edge toward the first edge, the second V-groove aligned along the first axis, and
a central groove positioned between the first V-groove and the second V-groove, wherein the first V-groove, the central groove, and the second V-groove are aligned end-to-end along the first axis;
a binder operable to physically couple the first end portion of the optical fiber to the first V-groove so that the first end of the optical fiber is directed towards the central groove and is aligned along the first axis;
a second binder operable to physically couple the second end portion of the optical fiber to the second V-groove so that the second end of the optical fiber is directed towards the central groove and is aligned along the first axis;
a first light transmissive mirror having at least a first partially reflective surface, the first light transmissive mirror aligned along the first axis and positioned at a first angle relative to the first axis, the first light transmissive mirror operable to receive the first light beam exiting the first end of the optical fiber via a first intervening free space, the first light transmissive mirror operable to transmit the first light beam received via the first intervening free space toward the second end of the optical fiber via a second intervening free space;
wherein the first light transmissive mirror is further operable to receive the first light beam from the first light source and to reflect the first light beam received from the first light source toward the second end of the optical fiber via the second intervening free space, wherein the first light source is located on a second axis that intersects the first axis at the first light transmissive mirror;
a second light transmissive mirror having at least a second partially reflective surface, the second light transmissive mirror aligned along the first axis and positioned at a second angle relative to the first axis, the second light transmissive mirror operable to receive the second light beam exiting the second end of the optical fiber via the first intervening free space, the second light transmissive mirror operable to transmit the second light beam received via the second intervening free space toward the first end of the optical fiber via the first intervening free space;
wherein the second light transmissive mirror is further operable to receive the second light beam from the second light source and to reflect the second light beam received from the second light source toward the first end of the optical fiber via the first intervening free space, wherein the second light source is located on a third axis that intersects the first axis at the second light transmissive mirror.

13. The fiber optic system of claim 12 wherein the central portion of the optical fiber comprises:
a plurality of loops.

14. The fiber optic system of claim 13 further comprising:
at least one detector operable to determine a motion of the optical fiber.

15. The fiber optic system of claim 12, further comprising:
a first ball lens in a portion of the first intervening free space, wherein the first ball lens is in alignment with the first axis; and
a second ball lens in a portion of the second intervening free space, wherein the second ball lens is in alignment with the first axis, wherein the first ball lens is operable to receive the first light beam from the first end of the optical fiber, is operable to communicate the first light beam to the second ball lens, is operable to receive the second light beam from the second ball lens, and is operable to communicate the second light beam to the first end of the optical fiber, and wherein the second ball lens is operable to receive the second light beam from the second end of the optical fiber, is operable to communicate the second light beam to the first ball lens, is operable to receive the first light beam from the first ball lens, and is operable to communicate the first light beam to the second end of the optical fiber.

16. The fiber optic system of claim 12, further comprising:
a third light transmissive mirror aligned along the first axis between the first end of the optical fiber and the second end of the optical fiber and positioned at an angle relative to the axis, wherein a first portion of the first light beam is transmitted through the third light transmissive mirror, while a second portion of the first light beam is reflected by the third light transmissive mirror to a first photodetector located on a fourth axis that intersects the first axis; and wherein a first portion of the second light beam is transmitted through the second light transmissive mirror, while a second portion of the second light beam is reflected by the third light transmissive mirror to a second photodetector located on a fifth axis that intersects the first axis.

17. The fiber optic system of claim 12, wherein the first end V-groove portion is offset from the second end V-groove portion to compensate for transverse displacement of the light transmitted through the light transmissive mirror.

* * * * *